(12) United States Patent
Kim et al.

(10) Patent No.: US 9,685,168 B2
(45) Date of Patent: *Jun. 20, 2017

(54) APPARATUS FOR ENCODING/DECODING MULTICHANNEL SIGNAL AND METHOD THEREOF

(71) Applicant: SAMSUNG ELECTRONICS CO., LTD., Suwon-si (KR)

(72) Inventors: Jung-Hoe Kim, Hwaseong-si (KR); Eun Mi Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,928

(22) Filed: Jun. 10, 2016

(65) Prior Publication Data

US 2016/0284360 A1 Sep. 29, 2016

Related U.S. Application Data

(63) Continuation of application No. 14/822,377, filed on Aug. 10, 2015, now Pat. No. 9,374,128, which is a
(Continued)

(51) Int. Cl.
*G10L 19/008* (2013.01)
*G10L 19/00* (2013.01)
*G10L 21/04* (2013.01)
*H04S 3/02* (2006.01)
*G10L 19/22* (2013.01)
(Continued)

(52) U.S. Cl.
CPC ............ *G10L 19/22* (2013.01); *G10L 19/008* (2013.01); *G10L 19/038* (2013.01); *G10L 19/167* (2013.01); *H04B 1/665* (2013.01); *H04S 1/002* (2013.01); *G10L 19/00* (2013.01); *G10L 19/0212* (2013.01); *G10L 21/04* (2013.01); *G10L 2019/0001* (2013.01); *H04R 3/04* (2013.01); *H04S 3/02* (2013.01)

(58) Field of Classification Search
CPC ... G10L 19/008; G10L 19/0017; G10L 25/18; G10L 19/06; G10L 19/08; G10L 19/12; G10L 25/12
USPC .............. 381/22–23; 704/229–300, 500–504
See application file for complete search history.

(56) References Cited

U.S. PATENT DOCUMENTS

2005/0246180 A1  11/2005  Saito
2007/0165869 A1   7/2007  Ojanpera
(Continued)

FOREIGN PATENT DOCUMENTS

KR   10-2006-0109298 A   10/2006

OTHER PUBLICATIONS

Communication from the Korean Intellectual Property Office dated Aug. 31, 2015 in a counterpart Korean application No. 10-2009-0032497.
(Continued)

*Primary Examiner* — George Monikang
(74) *Attorney, Agent, or Firm* — Sughrue Mion, PLLC

(57) ABSTRACT

Provided is an encoding/decoding apparatus and method of multi-channel signals. The encoding apparatus and method of multi-channel signals may encode phase information of the multi-channel signals using a quantization scheme and a lossless encoding scheme, and the decoding apparatus and method of multi-channel signals may decode the phase information using an inverse-quantization scheme and a lossless decoding scheme.

12 Claims, 8 Drawing Sheets

Related U.S. Application Data continuation of application No. 12/761,720, filed on Apr. 16, 2010, now Pat. No. 9,112,591.

(51) Int. Cl.
| | | |
|---|---|---|
| *H04B 1/66* | (2006.01) | |
| *H04S 1/00* | (2006.01) | |
| *G10L 19/038* | (2013.01) | |
| *G10L 19/16* | (2013.01) | |
| *G10L 19/02* | (2013.01) | |
| *H04R 3/04* | (2006.01) | |

(56) References Cited

U.S. PATENT DOCUMENTS

| | | |
|---|---|---|
| 2008/0095384 A1 | 4/2008 | Son et al. |
| 2009/0187409 A1 | 7/2009 | Krishnan et al. |
| 2009/0326958 A1 | 12/2009 | Kim et al. |

OTHER PUBLICATIONS

J.D. Johnston; A.J. Ferreira, Sum-Difference Stereo Transform Coding, 1992, IEEE.
USPTO Notice of Allowance mailed Mar. 5, 2013 in related U.S. Appl. No. 13/462,097.
USPTO Office Action mailed Oct. 3, 2012 in related U.S. Appl. No. 13/462,097.
USPTO Office Action issued in parent U.S. Appl. No. 14/822,377 mailed Oct. 8, 2015.
USPTO Notice of Allowance issued in parent U.S. Appl. No. 14/822,377 mailed Feb. 19, 2016.

APPARATUS FOR ENCODING/DECODING MULTICHANNEL SIGNAL AND METHOD THEREOF

CROSS REFERENCE TO RELATED APPLICATIONS

This application is a continuation application of U.S. application Ser. No. 14/822,377 filed on Aug. 10, 2015, which is set to issue as U.S. Pat. No. 9,374,128 on Jun. 21, 2016, which is a continuation of U.S. application Ser. No. 12/761,720 filed on Apr. 16, 2010, now U.S. Pat. No. 9,112,591, the disclosures of which are incorporated herein by references in their entireties.

BACKGROUND

1. Technical Field

One or more embodiments relate to an encoding/decoding apparatus and method of multi-channel signals, and more particularly, to an encoding apparatus and method of multi-channel signals that may encode phase information through a quantization scheme and a lossless encoding scheme, and a decoding apparatus and method of multi-channel signals that may decode phase information through an inverse-quantization scheme and a lossless decoding scheme.

2. Related Art

As a method of coding stereo signals, a Parametric Stereo (PS) technology may be used. The PS technology may generate mono-signals by down-mixing inputted stereo signals, extract a stereo parameter indicating side information for the stereo signals, and code the stereo signals by coding the generated mono signals and the extracted stereo parameter.

In this case, as examples of the stereo parameter, Inter-channel Intensity Difference (IID) or Channel Level Difference (CLD) signifying an intensity difference between energy levels of at least two channel signals included in the stereo signals, Inter-channel Coherence (ICC) or Inter-channel Correlation (ICC) signifying correlation between two channel signals based on similarity of wave forms of at least two channel signals included in the stereo signals, Inter-channel Phase Difference (IPD) signifying a phase difference between at least two channel signals included in the stereo signals, Overall Phase Difference (OPD) signifying how a phase difference between at least two channel signals included in the stereo signals is distributed based on mono-signals, and the like may be given.

SUMMARY

According to an aspect of one or more embodiments, there may be provided an encoding apparatus of multi-channel signals, comprising: a parameter extraction unit to extract a plurality of parameters indicating characteristic relation among a plurality of channels constituting the multi-channel signals; a parameter quantization unit to quantize the plurality of parameters; a parameter encoding unit to encode the plurality of quantized parameters; a mono-signal encoding unit to encode a mono-signal obtained by down-mixing the multi-channel signals; and a bitstream generation unit to generate an encoded bitstream for the multi-channel signals using the plurality of encoded parameters and the encoded mono-signal, wherein the plurality of parameters includes a phase parameter, and the parameter encoding unit encodes the quantized phase parameter using a Huffman coding scheme.

According to an aspect of one or more embodiments, there may be provided a decoding apparatus of multi-channel signals, comprising: a mono-signal decoding unit to decode, from an encoded bitstream of a multi-channel signal, a mono-signal corresponding to a down-mixed signal of the multi-channel signal; a parameter decoding unit to decode, from the bitstream, a plurality of parameters indicating a characteristic relation among a plurality of channels constituting the multi-channel signals; a parameter estimation unit to estimate an Overall Phase Difference (OPD) regarding a phase difference between the multi-channel signals and the decoded mono-signal, using the plurality of decoded parameters; a parameter inverse-quantization unit to inverse-quantize the decoded parameters and the estimated OPD; and an up-mixing unit to up-mix the mono-signal using the inverse-quantized plurality of parameters and the inverse-quantized OPD.

According to an embodiment, there is an encoding/decoding apparatus of multi-channel signals, which may effectively encode/decode a phase parameter, thereby reducing a number of bits used for expressing the phase parameter.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
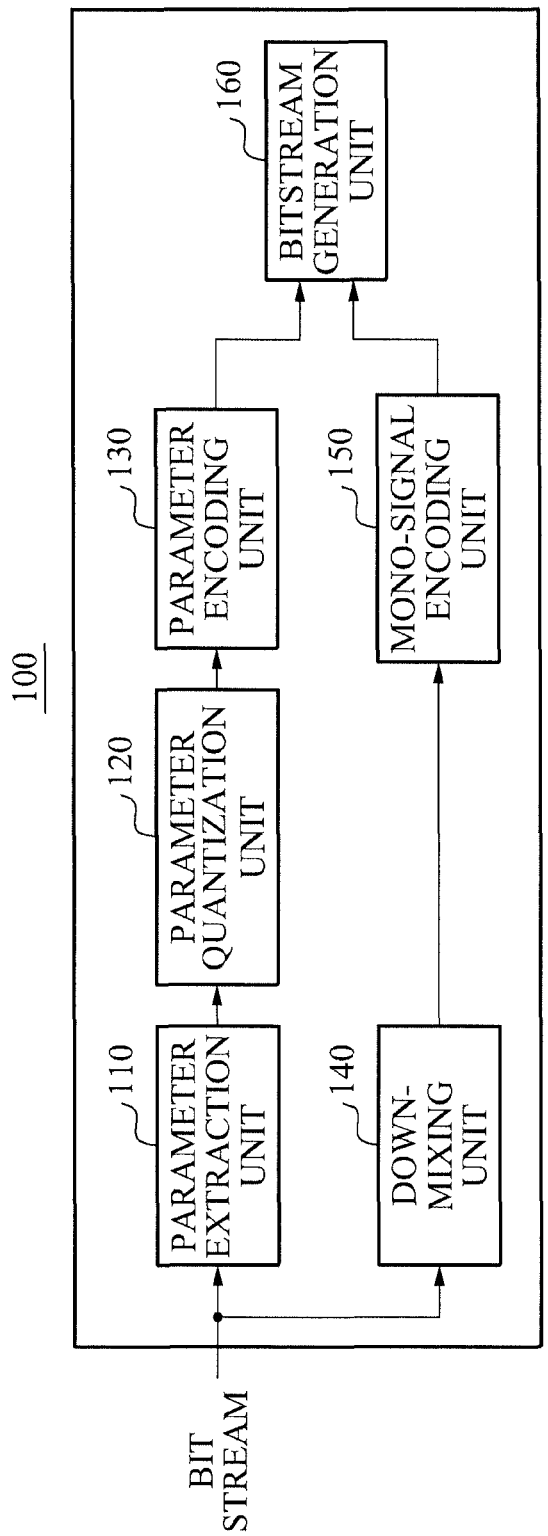
FIG. 1 is a block diagram illustrating a configuration of an encoding apparatus of multi-channel signals according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 is a block diagram illustrating a configuration of an encoding apparatus 100 of multi-channel signals according to an embodiment.

The encoding apparatus 100 includes a parameter extraction unit 110, a parameter quantization unit 120, a parameter encoding unit 130, a down-mixing unit 140, a mono-signal encoding unit 150, and a bitstream generation unit 160. Hereinafter, functions for each of the above mentioned components will be described.

Here, the multi-channel signals may signify signals of a plurality of channels, and each of the plurality of channels included in the multi-channel signals may be referred to as a channel signal.

Also, for convenience of description, it may be assumed that the multi-channel signal inputted in the encoding apparatus 100 is a stereo-signal including a left channel signal and a right channel signal. However, it is well understood to those skilled in the art that the encoding apparatus 100 according to an embodiment is limited to the stereo signals, and used in encoding the multi-channel signal.

The parameter extraction unit 110 may extract a plurality of parameters indicating a characteristic relation between the left channel signal and right channel signal included in the stereo signal. The plurality of parameters may include a Channel Level Difference (CLD), an Inter-channel Coherence (ICC), an Inter-channel Phase Difference (IPD), an Overall Phase Difference (OPD), and the like. Here, the IPD and the OPD may be an example of a phase parameter regarding phase information between the left channel signal and the right channel signal.

The parameter quantization unit 120 may quantize the extracted plurality of parameters, and the parameter encoding unit 130 may encode the quantized plurality of parameters.

In this instance, since the OPD is estimated from other parameters, the parameter encoding unit 120 according to an embodiment may encode only the CLD, the ICC, and the IPD from among the extracted plurality of parameters, and does not encode the OPD. Specifically, the encoding apparatus 100 may reduce a number of bits of a transmitted bitstream without encoding and transmitting the OPD. Further descriptions of the estimation of the OPD will be made with reference to a decoding apparatus 400 of a multi-channel signal of FIG. 4.

According to an embodiment, the parameter quantization unit 120 may quantize the CLD or the ICC. In this case, the CLD may be quantized into 8 levels or 16 levels, and the ICC may be quantized into an 8-level.

Also, according to an embodiment, the parameter quantization unit 120 may quantize the phase parameter such as the IPD or the OPD other than the CLD and the ICC. In this case, the phase parameter may be quantized into an 8-level or a 16-level.

When the CLD or the ICC is quantized by the parameter quantization unit 120, the parameter encoding unit 130 may encode the quantized CLD between a current frame and a previous frame or a differential value of the quantized ICC. Specifically, the parameter encoding unit may encode the CLD or the ICC using a differential coding scheme.

As an example, when the CLD or the ICC is quantized into an 8-level by the parameter quantization unit 120, the CLD or the ICC may have a difference range of 15 steps ranging from −7 to 7, and the parameter encoding unit 130 may encode the CLD or the ICC having the difference range of 15 steps. As another example, when the CLD or the ICC is quantized into a 16-level, the CLD or the ICC may have a difference range of 31 steps ranging from −15 to 15, and the parameter encoding unit 130 may encode the CLD having a difference range of 31 steps.

When the phase parameter is quantized by the parameter quantization unit 120, the parameter encoding unit 130 may encode a differential value of the quantized phase parameter between the current frame and the previous frame.

As an example, when the phase parameter is quantized into an 8-level by the parameter quantization unit 120, the parameter encoding unit 130 may encode a phase parameter having a differential range of 15 steps. As another example, when the phase parameter is quantized into a 16-level by the parameter quantization unit 120, the parameter encoding unit 130 may encode a phase parameter having a differential range of 31 steps.

Since a phase has a wrapping property having a periodicity based on 360°, for example, 370° is the same as 10°, a number of bits allocated to express corresponding phase information may be reduced when quantizing the phase parameter using the wrapping property.

According to an embodiment, the parameter encoding unit 130 may apply a modulo operation to a differential value of a phase parameter having the wrapping property, so that the differential value may always have a positive value. Thus, the parameter encoding unit 130 may not transmit a sign bit provided to the phase parameter, so that a number of bits used to express the phase parameter may be reduced. Also, when applying the modulo operation to the differential value of the phase parameter having the wrapping property, discontinuity between the phase parameters may occur due to the wrapping property, so that an entropy of a phase parameter distribution may be prevented from increasing.

When a phase parameter is quantized into an 8-level by the parameter quantization unit 120, the phase parameter may have a differential range ranging from 0 to 7, and when a phase parameter is quantized into a 16-level by the parameter quantization unit 120, the phase parameter may have a differential range ranging from 0 to 15. Table 1 shows an example of quantization values of the phase parameter having been quantized into the 8-level, and Table 2 shows an example of quantization values of the phase parameter having been quantized into the 16-level.

TABLE 1

| | Index | | | | | | | |
|---|---|---|---|---|---|---|---|---|
| | 0 | 1 | 2 | 3 | 4 | 5 | 6 | 7 |
| Representation level | 0 | π/4 | π/2 | 3π/4 | π | 5π/4 | 3π/2 | 7π/4, | and

TABLE 2

| | Index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Representation level | 0 | π/8 | π/4 | 3π/8 | π/2 | 5π/8 | 3π/4 | 7π/8 | π | 9π/8 | 5π/4 | 11π/8 | 3π/2 | 13π/8 | 7π/4 | 15π/8. |

For example, when a phase parameter is an IPD having been quantized into an 8-level, the parameter encoding unit 130 may operate a differential value of the phase parameter by applying a modulo-8 operation, which will be expressed by the following Equation 1.

$$\Delta IPD = (IPD - IPD_1 + 8)\%8. \qquad \text{[Equation 1]}$$

Here, IPD represents an IPD value of a current frame, $IPD_1$ represents an IPD value of a previous frame, '%8' represents a modulo-8 operation, and ΔIPD represents a differential value of an IPD obtained through the modulo-8 operation.

Table 3 shows examples of ΔIPD values obtained through the modulo-8 operation.

In Table 3, 'Previous' corresponds to $IPD_1$, 'Current' corresponds to IPD, 'Diff.' corresponds to $IPD-IPD_1$, and 'Diff with modulo' corresponds to ΔIPD, respectively.

TABLE 3

| Index | Previous | Current | Diff. | Diff with Modulo |
|---|---|---|---|---|
| Case1 | 4 | 6 | 2 | (2 + 8)%8 = 2 |
| Case2 | 6 | 4 | −2 | (−2 + 8)%8 = 6 |
| Case3 | 0 | 7 | 7 | (7 + 8)%8 = 7 |
| Case4 | 7 | 0 | −7 | (−7 + 8)%8 = 1 |

In general, when 'Diff.' is 0, the lowest number of bits may be obtained, and when 'Diff.' is closer to 0 or 7, the number of bits may be reduced. Since previous data is slowly changed, '0' may signify no difference with a previous frame, '7' may signify −1 of a difference with the previous frame, and '1' may signify 1 of the difference with the previous frame. Accordingly, when 'Diff.' is '1', the highest frequency may be obtained, so that a smaller number of bits may be allocated.

The parameter encoding unit 130 may encode a difference of a parameter quantized through a lossless encoding scheme. For example, the parameter encoding unit 130 may encode the quantized parameter using a Huffman coding scheme.

The Huffman coding scheme may be one of entropy coding schemes used in the lossless encoding scheme, and may be a coding algorithm where a sign with different lengths depending on a generation frequency of a symbol corresponding to each data is used.

As the Huffman coding scheme, a 1D Huffman coding scheme and a 2D Huffman coding scheme may be used. The 1D Huffman coding scheme may signify a method of encoding each data regarded as a single symbol, and the 2D Huffman coding scheme may a method of grouping a plurality of pieces of data into a plurality of data groups including two pieces of data, and encoding the plurality of data groups (i.e. pairs of two pieces of data) regarded as a single symbol.

Specifically, when encoding a plurality of parameters using the 1D Huffman coding scheme, the parameter encoding unit 130 may directly encode each of the plurality of parameters using the 1D Huffman coding scheme.

As an example, when encoding the CLD or the ICC, the parameter encoding unit 130 may perform the 1D Huffman coding scheme on each of a plurality of CLD values or a plurality of ICC values, each regarded as a single symbol.

As another example, when encoding a phase parameter, the parameter encoding unit 130 may perform the 1D Huffman coding scheme on each of a plurality of phase parameter values, each regarded as a single symbol.

Also, when encoding a plurality of parameters using the 2D Huffman coding scheme, the parameter encoding unit 130 may perform the 2D Huffman coding scheme on a pair of parameters including two parameters.

When encoding the plurality of parameters using the 2D Huffman coding scheme, a correlation between the two parameters constituting the pair of parameters may be reduced. Also, when encoding the plurality of parameters using the 2D Huffman coding scheme, a bit rate may be reduced due to a joint probability of two symbols between the two parameters constituting the pair of parameters.

Hereinafter, operations of the parameter encoding unit 130 of encoding a parameter using the 2D Huffman coding scheme will be further described with reference to FIGS. 2 and 3.

Figure 2:
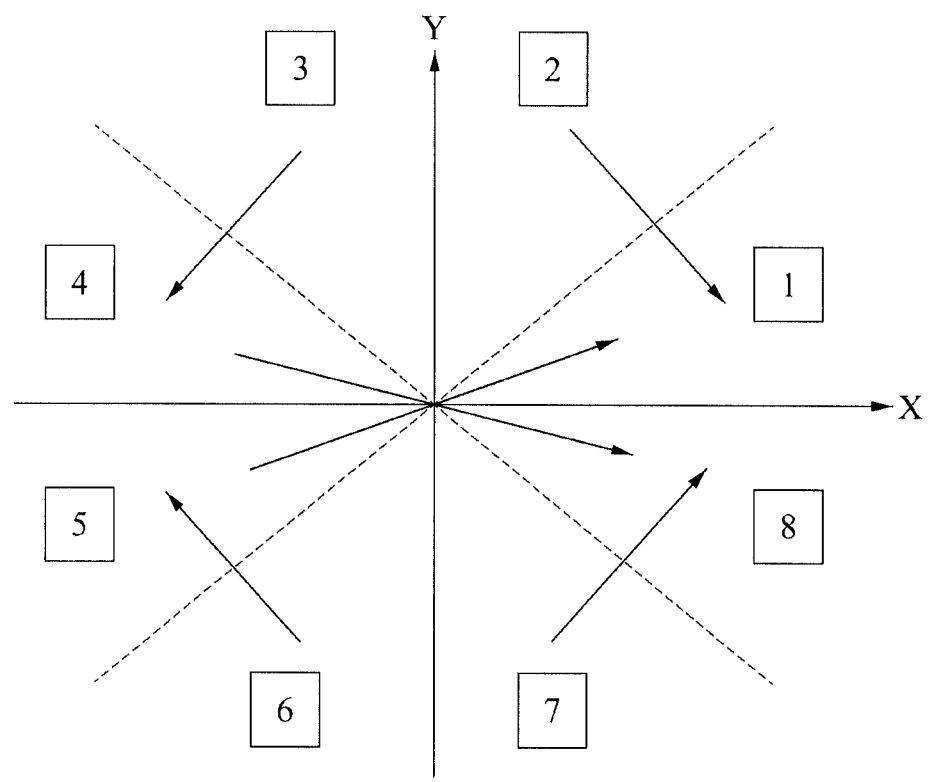
FIG. 2 is a diagram used for describing a concept of encoding parameters by applying a 2D Huffman coding scheme on pairs of parameters including parameters not having a wrapping property.

FIG. 2 is a diagram used for describing a concept of encoding parameters by applying the 2D Huffman coding scheme on pairs of parameters including parameters not having a wrapping property, such as the CLD or the ICC.

Here, the pairs of parameters are expressed as (X, Y). Each of X and Y correspond to a single parameter. For example, in a case of the CLD, each of X and Y may correspond to a single CLD value.

The parameter encoding unit 130 may perform the 2D Huffman coding scheme based on the following three steps.

First, the parameter encoding unit 130 may change X or Y, so that an absolute value of X is greater than an absolute value of Y, that is, '|X|>|Y|'. Since, a pair of symbols of X/Y may have a greater value on an X-axis when satisfying '|X|>|Y|', a degree where data is skewed may increase, resulting in a reduction in a bit rate. Accordingly, parameters existing in a second region may be moved to a first region, parameters existing in a third region may be moved to a fourth region, parameters existing in a sixth region may be moved to a fifth region, and parameters existing in a seventh region may be moved to an eighth region, respectively. In this case, side information of one bit may be applied to each of pairs of the moved parameters.

Next, the parameter encoding unit 130 may change X or Y, so that a sum of X and Y is less than '0', that is, '(X+Y)<0'. When satisfying '(X+Y)<0', a sign of each of X and Y may be changed to enable a generated symbol to have a positive value.

In this manner, parameters existing in the fourth region may be moved to the first region, and parameters existing in the fifth region may be moved to the eighth region, respectively. In this case, side information of one bit may be applied to each of pairs of the moved parameters. A pair of (X, Y) where a corresponding region is moved is referred to as (X', Y').

Next, the parameter encoding unit 130 may obtain a pair of parameters having been finally decoded through a Largest Absolute Value (LAV) coding scheme that is performed using a parameter having an LAV from among a plurality of parameters. The LAV may be side information used for the 2D Huffman coding, and may be transmitted through the Huffman coding. The LAV may denote a symbol value having the largest absolute value corresponding to a frame to be currently encoded, and a codebook of the 2D Huffman coding may be determined based on the LAV.

The LAV may be side information for the 2D Huffman coding, and may be encoded and transmitted through the Huffman coding. The LAV may denote a symbol having the largest absolute symbol value from among symbols corresponding to the frame to be currently encoded. The parameter encoding unit 130 may determine a codebook of the 2D Huffman coding based on the LAV.

The LAV coding scheme using the LAV may be a coding method for reducing a size of a table used for the 2D Huffman coding, and each parameter of the LAV coding scheme may be expressed as four symbols configured of '1', '3', '5', and '7'.

In a case of the CLD or the ICC, along with an increase in a difference between a CLD value or ICC value of a previous frame and a CLD value or ICC value of a current frame, a generation frequency may be reduced. Accordingly, when the LAV is '7', the generation frequency may be the smallest value. The CLD and the ICC may apply the same Huffman codebook. A syntax regarding the Huffman codebook is illustrated in Table 4.

TABLE 4

```
const HUFF_LAV_TAB huffLavTab =
{
    {0x0, 0x2, 0x6, 0x7}
    {1, 2, 3, 3}
    {1, 3, 5, 7}
}
```

Here, {0x0, 0x2, 0x6, 0)(7} may denote a codebook, {1, 2, 3, 3} denotes a length of the codebook, and {1, 3, 5, 7} denotes an LAV.

A pair of parameters (X", Y") having been finally decoded using the LAV coding scheme may be obtained through an algorithm illustrated in Table 5.

TABLE 5

```
if((X'+Y') % 2) {
    X" = LAV + (1−X'−Y')/ 2;
    Y" = LAV + (1−X'+Y')/ 2;
}
else {
    X" = (X'+Y')/ 2;
    Y" = (X'−Y')/ 2;
}
```

Here, 'LAV' denotes the largest absolute value, and '% 2' denotes a modulo-2 operation.

Figure 3:
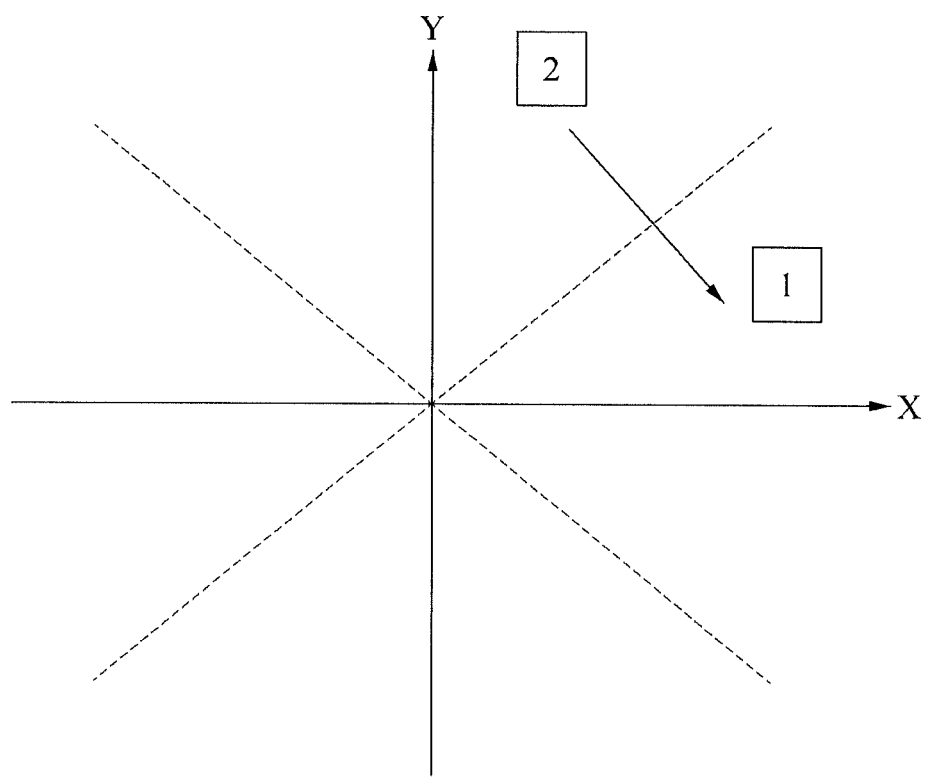
FIG. 3 is a diagram used for describing a concept of encoding parameters by applying a 2D Huffman coding scheme on pairs of parameters including parameters having a wrapping property.

FIG. 3 is a diagram used for describing a concept of encoding parameters by applying the 2D Huffman coding scheme on pairs of parameters including parameters having a wrapping property, such as the IPD or the OPD.

In this case, different from the 2D Huffman coding scheme described in FIG. 2, the 2D Huffman coding scheme may perform the following two steps.

First, the parameter encoding unit 130 may change X and Y, so that an absolute value of X is greater than an absolute value of Y, that is, '|X|>|Y|'.

As described above, since a difference of a quantized phase parameter always has a positive value when applying the modulo-operation to the difference of the quantized phase parameter, the phase parameter may exist only in the first region. Accordingly, side information of one bit may be applied to pairs of parameters where a corresponding region is moved.

Referring to the pair of parameters (X, Y) where the corresponding region is moved as (X', Y'), X' and Y' may be obtained based on the following Equation 2.

$X'=(X+Y)/2$, and $Y'=(X-Y)/2$.  [Equation 2]

Next, the parameter encoding unit may obtain a pair of parameters having been finally encoded through the LAV coding scheme using a parameter having an LAV from among a plurality of parameters.

The pair of parameters (X", Y") having been finally encoded through the LAV coding scheme may be obtained based on the algorithm illustrated in Table 5 above.

When a phase parameter is encoded by the parameter encoding unit 130, a region movement may occur once, different from when encoding a parameter such as the CLD or the ICC. Accordingly, the phase parameter is encoded by the parameter encoding unit 130, a number of transmitted bits may be less than a number of transmitted bits when encoding the parameter such as the CLD or the ICC.

A distribution of an LAV of the IPD may differ from that of the CLD or the ICC. When a difference is '7', the IPD may have the greatest generation frequency. For example, the IPD may have an LAV distribution as illustrated in Table 6.

TABLE 6

| Value | 1 | 3 | 5 | 7 |
|---|---|---|---|---|
| symbol | 0 | 1 | 2 | 3 |
| symbol freq | 208 | 29 | 12 | 381 |
| symbol bit | 1.598768 | 4.441227 | 5.714246 | 0.725561 |

Allocation of a codebook length based on a probability distribution, that is, the Huffman coding scheme may be performed referring to an actual distribution of a symbol and a Huffman codebook length. When the actual distribution and the Huffman codebook length do not match to each other, an optimal performance may not be obtained. Accordingly, the parameter encoding unit 130 may re-map a symbol, and encode the re-mapped symbol, thereby overcoming distribution mismatching. In this case, the parameter encoding unit 130 may re-map the symbol based on the following Equation 3.

$sym=(sym+3)\% 4$.  [Equation 3]

Here, 'sym' denotes a symbol, and '%4' denotes a modulo-4 operation.

A relation between the re-mapped symbol and the Huffman codebook is shown in Table 7.

TABLE 7

| Value | 1 | 3 | 5 | 7 |
|---|---|---|---|---|
| symbol | 0 | 1 | 2 | 3 |
| codebook | 10 | 110 | 111 | 0 |
| codebook length | 2 | 3 | 3 | 1 |
| entropy | 0.660317 | 0.138095 | 0.057143 | 0.604762 |

Tables 8 to 10 show a syntax regarding a 1D Huffman coding and a 2D Huffman coding which encode a phase parameter.

TABLE 8

| Syntax | Number of bits | Mnemonic |
|---|---|---|
| HuffData1D(dataType, diffType, pilotCodingFlag, dataBands){ | | |
|   pgOffset = 0; | | |
|   if ( diffType == DIFF_FREQ &&!pilotCodingFlag) { | | |
|     aHuffData1D[0] = 1Dhuff_dec(hcodFirstBand_XXX, bsCodeW); | 1 ... x | vlclbf |
|     pgOffset = 1; | | |
|   } | | |

TABLE 8-continued

| Syntax | Number of bits | Mnemonic |
|---|---|---|
| ```
for ( i=pgOffset;i<dataBands;i++ ) {
    aHuffData1D[i] = 1Dhuff_dec(hcod1D_XXX_YY, bsCodeW);
``` | 1 . . . x | vlclbf |
| ```
    if ( aHuffData1D[i] != 0 && dataType != IPD) {
        bsSign;
``` | 1 | Uimsbf |
| ```
        if ( bsSign ) {
            aHuffData1D[i] = −aHuffData1D[i];
        }
    }
  }
  return (aHuffData1D);
}
``` | | |

TABLE 9

| Syntax | Number of bits | Mnemonic |
|---|---|---|
| ```
HuffData2DFreqPair(dataType, diffType, pilotCodingFlag, dataBands){
    LavIdx = 1Dhuff_dec(hcodLavIdx, bsCodeW);
``` | 1 . . . 3 | Vlclbf |
| ```
    If(dataType==IPD) LavIdx = (LavIdx+3)%4;
    lav = lavTabXXX[LavIdx];
    pgOffset = 0;
    if ( diffType == DIFF_FREQ &&!pilotCodingFlag) {
        aHuffData2D[0] = 1Dhuff_dec(hcodFirstBand_XXX, bsCodeW);
``` | 1 . . . x | Vlclbf |
| ```
        pgOffset = 1;
        escapeCode = hcod2D_XXX_YY_FP_LL_escape;
        /* specific escape code belonging to this Huffman table */
        escCntr = 0;
    for ( i=pgOffset;i<dataBands;i+=2 ) {
        (aTmp[0], aTmp[1]) =
            2Dhuff_dec(hcod2D_XXX_YY_FP_LL, bsCodeW);
``` | 1 . . . x | Vlclbf |
| ```
        if (bsCodeWord != escapeCode ) {
            aTmpSym = SymmetryData( aTmp );
            aHuffData2D[i] = aTmpSym[0];
            aHuffData2D[i+1] = aTmpSym[1];
        }
        else {
            aEscList[escCntr++] = i;
        }
    }
  }
}
``` | | |

TABLE 10

| Syntax | Number of bits | Mnemonic |
|---|---|---|
| ```
SymmetryData(aDataPair, dataType){
    sumVal = aDataPair[0] + aDataPair[1];
    diffVal = aDataPair[0] − aDataPair[1];
    if ( sumVal > lav ) {
        aDataPair[0] = (2*lav+1) − sumVal;
        aDataPair[1] = − diffVal;
    }
    else {
        aDataPair[0] = sum Val;
        aDataPair[1] = diffVal;
    }
    if ( aDataPair[0] + aDataPair[1] != 0 && dataType != IPD) {
        bsSymBit[0];
``` | 1 | uimsbf |
| ```
        if ( bsSymBit[0] ) {
            aDataPair[0] = − aDataPair[0];
            aDataPair[1] = − aDataPair[1];
        }
    }
}
``` | | |

TABLE 10-continued

| Syntax | Number of bits | Mnemonic |
|---|---|---|
| if ( aDataPair[0] − aDataPair[1] != 0 ) {<br>    bsSymBit[1];<br>    if ( bsSymBit[1] ) {<br>        tmpVal = aDataPair[0];<br>        aDataPair[0] = aDataPair[1];<br>        aDataPair[1] = tmpVal;<br>    }<br>  }<br>} | 1 | uimsbf |

Also, a method where a table of mapping an LavIdx is defined may be used. The LavIdx denotes a symbol outputted through an actual Huffman decoding scheme, and lavTabIPD denotes an actual LAV of the symbol. In this case, a re-mapping of the symbol may be performed based on Table 11.

TABLE 11

| LavIdx | lavTabIPD [LavIdx] |
|---|---|
| 0 | 7 |
| 1 | 1 |
| 2 | 3 |
| 3 | 5 |

The encoding apparatus 100 of multi-channel signals according to an embodiment will be further described with reference to FIG. 1.

The down-mixing unit 140 may down-mix a stereo signal to output a mono signal.

The down-mixing may generate a mono signal of a single channel from stereo signals of at least two channels, and a number of bits of a bitstream generated in an encoding process may be reduced through the down-mixing. In this instance, the mono signal may be a representative signal of the stereo signal. Specifically, in the encoding apparatus 100 may not encode each of a left channel signal and a right channel signal included in the stereo signal, and may encode only the mono signal to transmit the encoded mono signal.

For example, a magnitude of the mono signal may be obtained as an average value of magnitudes of the left channel signal and the right channel signal, and a phase of the mono signal may be obtained as an average value of phases of the left channel signal and the right channel signal.

The mono signal encoding unit 150 may encode the mono signal outputted from the down-mixing unit 140.

As an example, when the stereo signal is a voice signal, the mono signal encoding unit 120 may encode the mono signal in a Code Excited Linear Prediction (CELP) scheme.

As another example, when the stereo signal is a music signal, the mono signal encoding unit 120 may encode the mono signal using a method similar to an existing Moving Picture Experts Group-2/4 Advanced Audio Coding (MPEG-2/4 AAC) scheme or an existing MPEG layer 3 (mp3).

The bitstream generation unit 160 may generate an encoded bitstream with respect to the stereo signal using a plurality of encoded parameters or encoded mono signals.

As described above, the encoding apparatus 100 may encode phase information of multi-channel signals through a quantization scheme and a lossless encoding scheme, and generate a bitstream including the encoded phase information. Hereinafter, a decoding apparatus of multi-channel signal according to an embodiment will be described with reference to FIG. 4.

Figure 4:
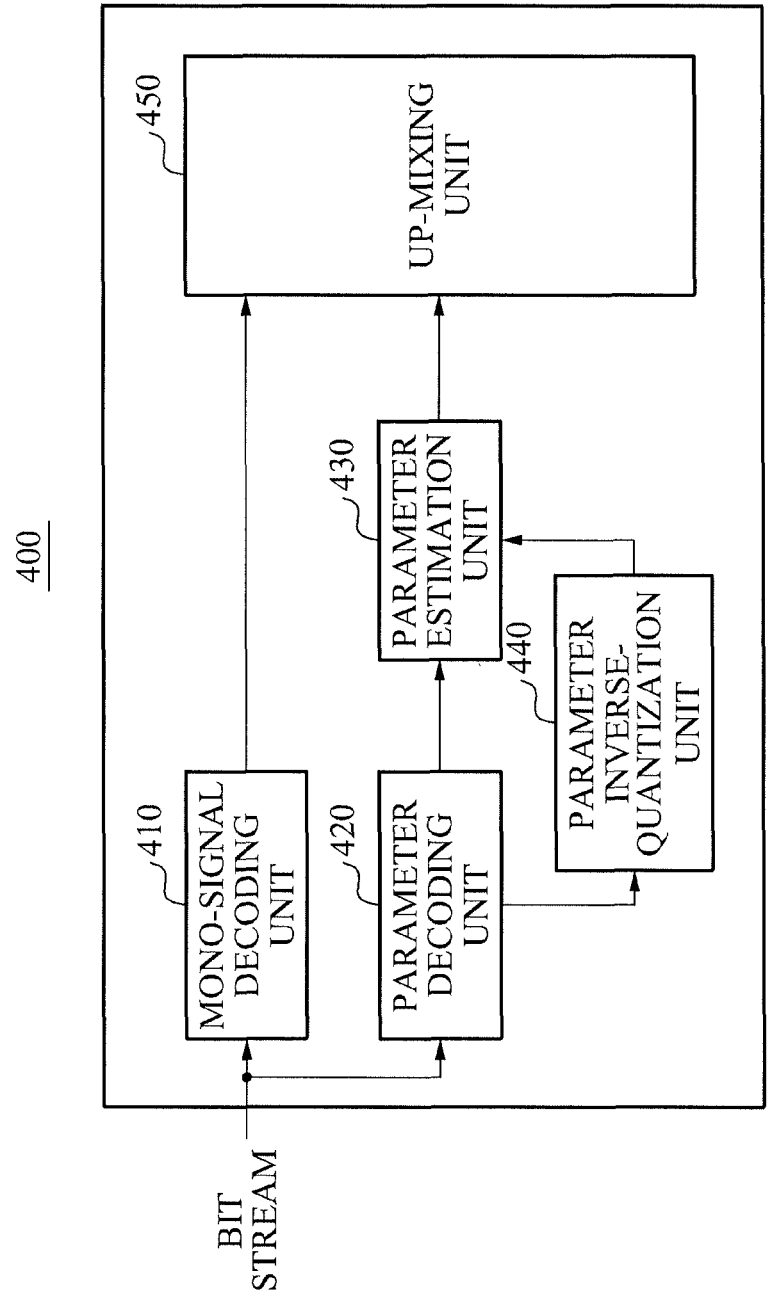
FIG. 4 is a block diagram illustrating a decoding apparatus of multi-channel signals according to an embodiment.

FIG. 4 is a block diagram illustrating a decoding apparatus of multi-channel signals according to an embodiment.

The decoding apparatus 400 includes a mono signal decoding unit 410, a parameter decoding unit 420, a parameter inverse quantization unit 430, a parameter estimation unit 440, and an up-mixing unit 450. Hereinafter, functions for each the above-mentioned components will be further described.

For convenience of description, it is assumed that a bitstream inputted to the decoding apparatus 400 is an encoded bitstream of a stereo signal.

The mono signal decoding unit 410 may restore, from the encoded bitstream of the stereo signal, a mono signal, that is, a down-mixed signal of the multi-channel signal. Specifically, when the mono signal is encoded in a time domain, the mono signal decoding unit 410 may decode the encoded mono signal in the time domain, and when the mono signal is encoded in a frequency domain, the mono signal decoding unit 410 may decode the encoded mono signal in the frequency domain.

The parameter decoding unit 420 may restore, from the encoded bitstream of the stereo signal, a plurality of parameters indicating a characteristic relation between a plurality of channels constituting the multi-channel signal. In this instance, the plurality of parameters may include a CLD, an ICC, and an IPD, however, may exclude an OPD.

When the OPD is excluded from the plurality of parameters, the parameter estimation unit 430 may estimate the OPD using a plurality of restored parameters.

Hereinafter, an operation of the parameter estimation 430 that may estimate the OPD will be further described. Here, equations described below may be merely an example, and thus a modification of each of the equations is possible, which is well understood by those skilled in the art.

The parameter estimation unit 430 may obtain a first intermediate variable c using the CLD based on the following Equation 4.

$$c(b) = 10^{\frac{CLD(b)}{20}}. \qquad \text{[Equation 4]}$$

Here, b denotes an index of a frequency band. In Equation 4, the first intermediate variable c may be obtained such that an IID value of a specific frequency band is divided by 20, and the obtained value is expressed in an index type of 10. In this instance, using the first intermediate variable c, a second intermediate variable $c_1$ and a third intermediate variable $c_2$ may be obtained as shown in Equations 5 and 6.

$$c_1(b) = \frac{\sqrt{2}}{\sqrt{1+c^2(b)}}, \text{ and} \quad \text{[Equation 5]}$$

$$c_2(b) = \frac{\sqrt{2}\,c(b)}{\sqrt{1+c^2(b)}}. \quad \text{[Equation 6]}$$

Specifically, the third intermediate variable may be obtained by multiplying the second intermediate variable $c_1$ by the first intermediate variable c.

Next, the parameter estimation unit 430 may obtain a first right channel signal and a first left channel signal using the restored mono signal, the second intermediate variable $c_1$, and the third intermediate variable $c_2$. The first right channel signal and the first left channel signal may be represented by Equations 7 and 8, respectively.

$$\hat{R}_{n,k} = c_1 M_{n,k}. \quad \text{[Equation 7]}$$

Here, n denotes a time slot index, and k denotes a parameter band index. The first right channel signal $\hat{R}_{n,k}$ may be expressed as a sum of the second intermediate variable $c_1$ and the restored mono signal M.

$$\hat{L}_{n,k} = c_2 M_{n,k}. \quad \text{[Equation 8]}$$

Here, the first left channel signal $\hat{L}_{n,k}$ may be expressed as a sum of the third intermediate variable $c_2$ and the restored mono signal M.

In this instance, when an IPD is $\phi$, a first mono signal $\hat{M}_{n,k}$ may be obtained using the first right channel signal $\hat{R}_{n,k}$ and the first left channel signal $\hat{L}_{n,k}$, which is represented by the following Equation 9.

$$|\hat{M}_{n,k}| = \sqrt{|\hat{L}_{n,k}|^2 + |\hat{R}_{n,k}|^2 - 2|\hat{L}_{n,k}||\hat{R}_{n,k}|\cos(\pi - \varphi)}. \quad \text{[Equation 9]}$$

Also, using Equations 6 to 9, a fourth intermediate variable p based on a time slot and a parameter band may be obtained by the following Equation 10.

$$p_{n,k} = \frac{|\hat{L}_{n,k}| + |\hat{R}_{n,k}| + |\hat{M}_{n,k}|}{2}. \quad \text{[Equation 10]}$$

Here, the fourth intermediate variable p may be obtained by dividing, by 2, a sum of intensities of the first left channel signal, the first right channel signal, and the first mono signal. In this instance, when an OPD value is $\phi_1$, the OPD may be obtained by the following Equation 11.

$$\varphi_1 = 2\arctan\left(\sqrt{\frac{(p_{n,k} - |\hat{L}_{n,k}|)(p_{n,k} - |\hat{M}_{n,k}|)}{p_{n,k}(p_{n,k} - |\hat{R}_{n,k}|)}}\right). \quad \text{[Equation 11]}$$

Also, when a value of a difference between the OPD and the IPD is $\phi_2$, $\phi_2$ may be obtained by the following Equation 12.

$$\varphi_2 = 2\arctan\left(\sqrt{\frac{(p_{n,k} - |\hat{R}_{n,k}|)(p_{n,k} - |\hat{M}_{n,k}|)}{p_{n,k}(p_{n,k} - |\hat{L}_{n,k}|)}}\right). \quad \text{[Equation 12]}$$

The obtained value $\phi_1$ in Equation 11 may denote a phase difference between the encoded mono signal and the left channel signal to be up-mixed, and the obtained value $\phi_2$ in Equation 12 may denote a phase difference between the encoded mono signal and the right channel signal to be up-mixed.

Equations 11 and 12 may be equivalent to the following Equation 13.

$$OPD_{left}^{l,m} = \arctan\left(\frac{c_2^{l,m}\sin(IPD^{l,m})}{c_1^{l,m} + c_2^{l,m}\cos(IPD^{l,m})}\right) \quad \text{[Equation 13]}$$

where $$c_1^{l,m} = \sqrt{\frac{10^{\frac{CLD^{l,m}}{10}}}{1 + 10^{\frac{CLD^{l,m}}{10}}}}, \quad c_2^{l,m} = \sqrt{\frac{1}{1 + 10^{\frac{CLD^{l,m}}{10}}}}.$$

Here, l and m denote a sub-band index and a parameter set, respectively.

As described above, the parameter estimation unit 430 may generate, from the restored mono signal, the first left channel signal and the first right channel signal with respect to the left channel signal and the right channel signal, using an IID signifying an intensity difference between channels of the stereo signal, and generate, from the first left channel signal and the first right channel signal, the first mono signal using an IPD signifying a phase difference between channels of the stereo signal, and estimate an OPD signifying a phase difference between the restored mono signal and the stereo signal, using the generated first left channel signal, the first right channel signal, and the first mono signal.

The parameter inverse quantization unit 440 may inverse-quantize the restored parameter and the parameter estimated from the restored parameter.

Hereinafter, operations of the parameter inverse quantization unit 440 that may inverse-quantize a parameter will be further described with reference to FIGS. 5 to 8.

Figure 5:
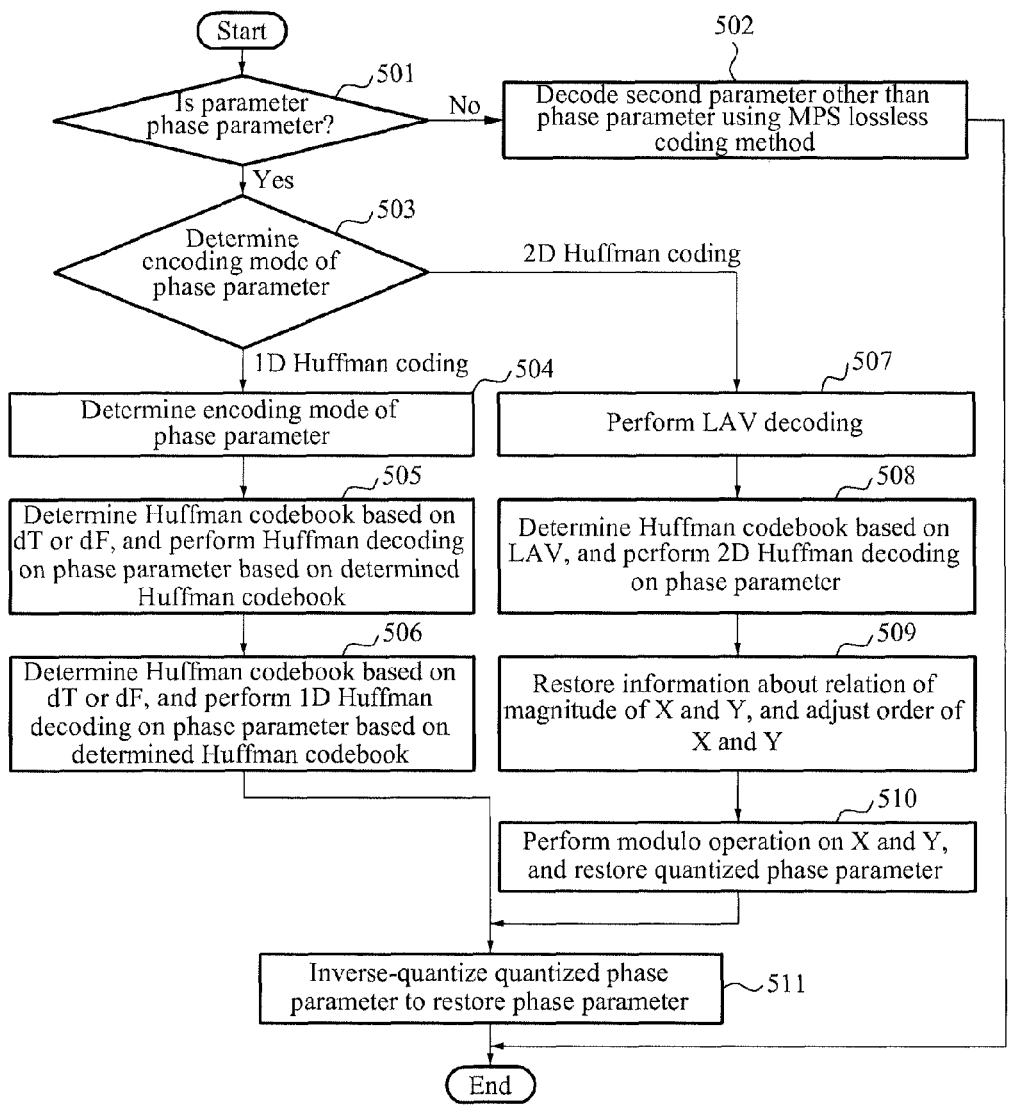
FIG. 5 is a flowchart illustrating operations of a parameter inverse-quantization unit of inverse-quantize parameters based on a Unified Speech and Audio Coding (USAC) scheme.

FIG. 5 is a flowchart illustrating operations of a parameter inverse-quantization unit 440 of inverse-quantize parameters based on a Unified Speech and Audio Coding (USAC) scheme.

In operation 501, the parameter inverse-quantization unit 440 may determine whether a type of a parameter is a phase parameter.

In operation 502, when the type of the parameter is different from the phase parameter, the parameter inverse-quantization unit 440 may inverse-quantize a second parameter other than the phase parameter using an MPEG Surround lossless coding method.

In operation 503, when the type of the parameter is the phase parameter, the parameter inverse-quantization unit 440 may determine an encoding mode of the phase parameter. More specifically, in operation 503, whether the encoding mode of the phase parameter is a 1D Huffman coding or a 2D Huffman coding may be determined.

In operation 504, when the encoding mode of the phase parameter is the 1D Huffman coding based on the determination of operation 503, the parameter inverse-quantization unit 440 may determine dT or dF. The dT may signify calculating a difference based on quantized phase information of the same band in a previous frame, and the dF may signify calculating a difference based on quantized phase information of a previous band of a current frame.

In operation 505, the parameter inverse-quantization unit 440 may determine a Huffman codebook based on the dT or the Df determined in operation 504, and perform a 1D Huffman decoding on the phase parameter based on the determined Huffman codebook.

In operation 506, the parameter inverse-quantization unit 440 may perform a modulo operation on a previous phase parameter and a current phase parameter based on the dT or the Df, and restore a quantized phase parameter.

In operation 507, when the encoding mode of the phase parameter is the 2D Huffman coding based on the determination of operation 503, the parameter inverse-quantization unit 440 may perform an LAV decoding.

In operation 508, the parameter inverse-quantization unit 440 may determine the Huffman codebook based on the LAV, and perform a 2D Huffman decoding on the phase parameter based on the determined Huffman codebook.

In operation 509, the parameter inverse-quantization unit 440 may restore information about a relation of magnitude of X and Y decoded by the 2D Huffman decoding, and rearrange an order of X and Y based on the restored information about the relation of magnitude.

In operation 510, the parameter inverse-quantization unit 440 may perform a modulo operation on the X and Y where the the order is rearranged, and restore the quantized phase parameter.

In operation 511, the parameter inverse-quantization unit 440 may inverse-quantize the quantized phase parameter restored in operation 508, and restore the phase parameter.

Figure 6:
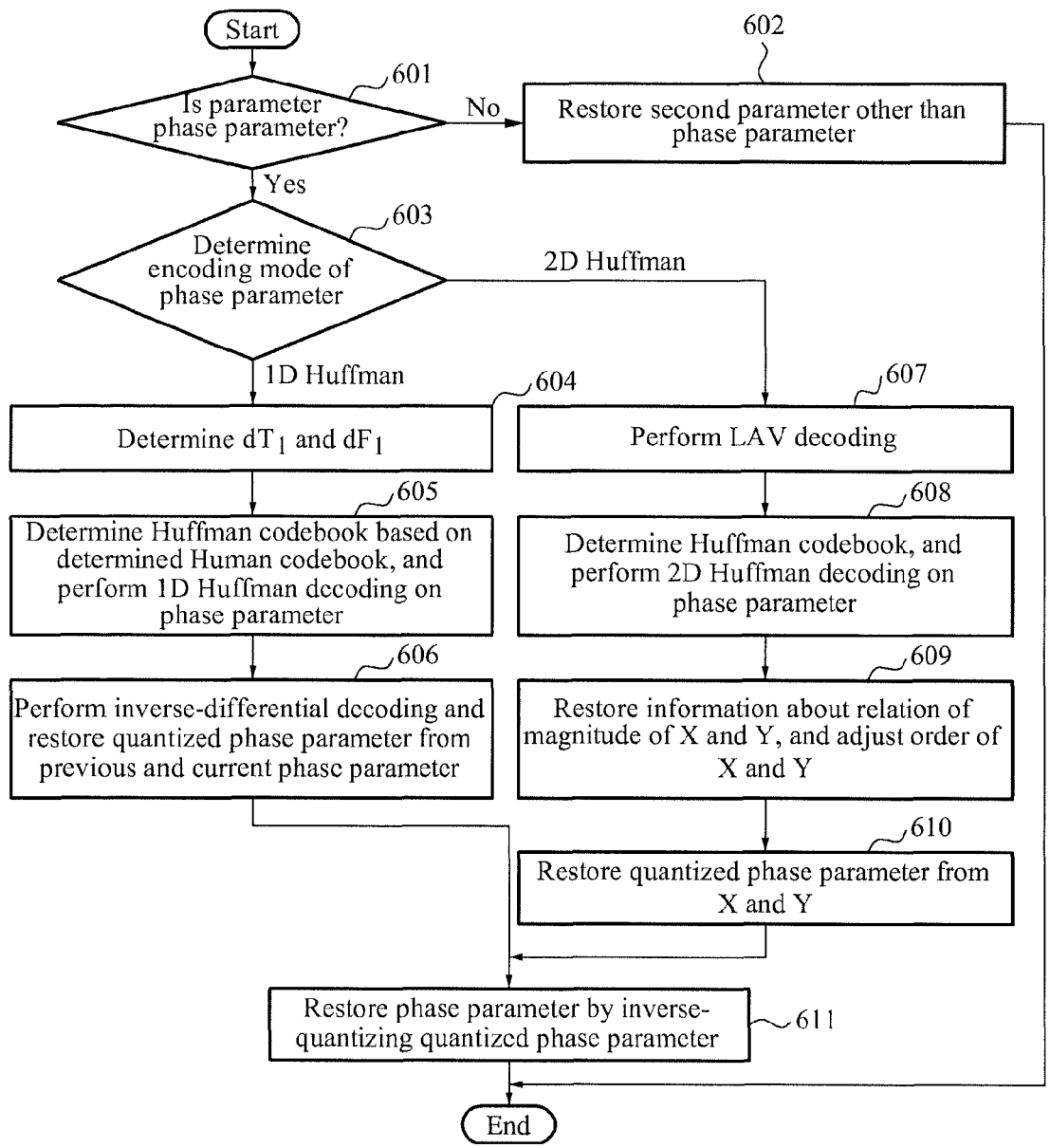
FIGS. 6 and 7 are flowcharts illustrating operations of a parameter inverse quantization unit of inverse-quantizing parameters using a Moving Picture Experts Group (MPEG) Surround lossless coding scheme.
Figure 7:
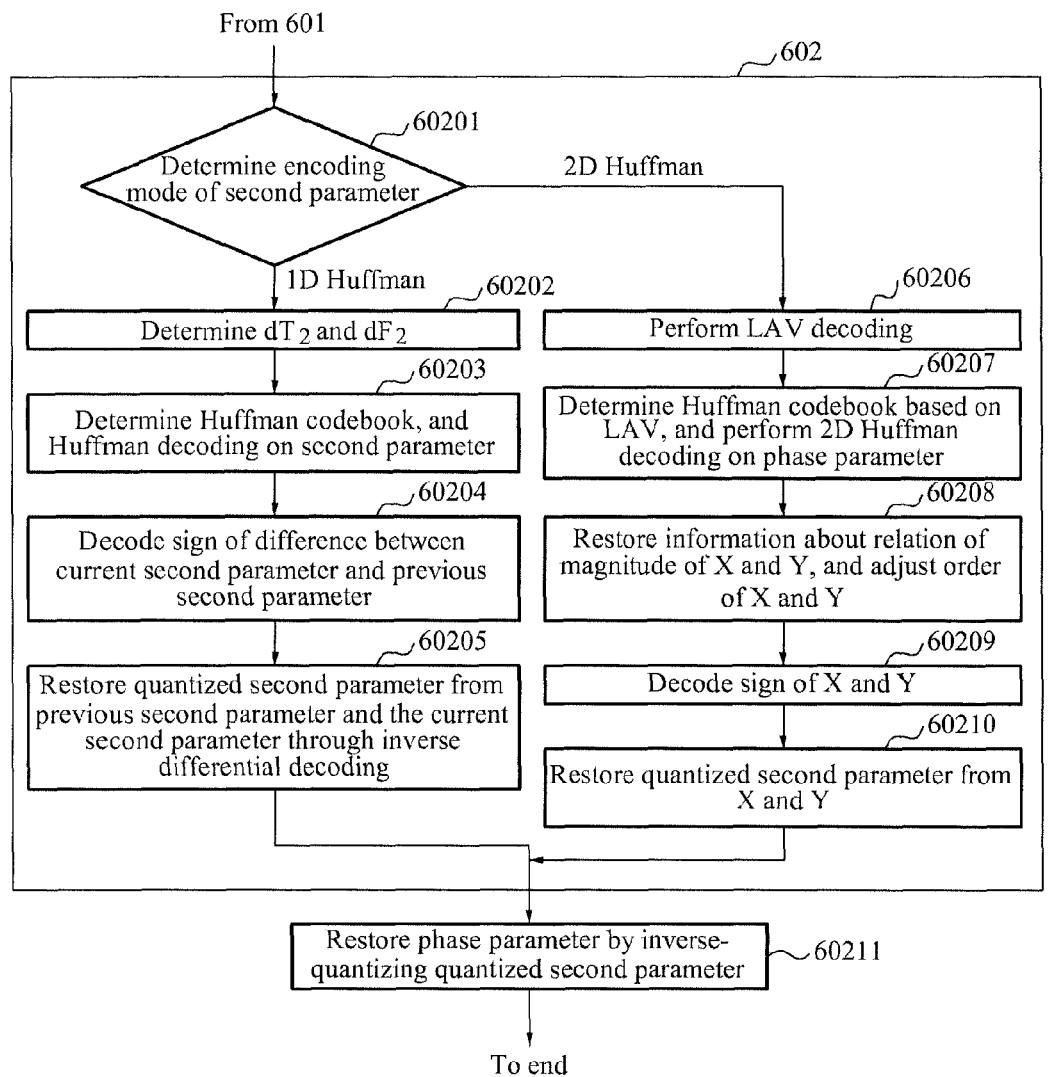

FIGS. 6 and 7 are flowcharts illustrating operations of the parameter inverse-quantization unit 440 of inverse-quantizing parameters using an MPEG Surround lossless coding scheme.

In operation 601, the parameter inverse-quantization unit 440 may determine whether a type of a parameter is a phase parameter.

In operation 603, when the type of the parameter is the phase parameter based on the determination of operation 601, the parameter inverse-quantization unit 440 may determine an encoding mode of the phase parameter. Specifically, in operation 603, whether the encoding mode of the phase parameter is a 1D Huffman coding or a 2D Huffman coding.

In operation 604, when the encoding mode of the phase parameter is the 1D Huffman coding based on the determination of operation 603, the parameter inverse-quantization unit 440 may determine $dT_1$ or $dF_1$.

In operation 605, the parameter inverse-quantization unit 440 may determine a Huffman codebook based on the determined $dT_1$ or $dF_1$, and perform a 1D Huffman decoding on the phase parameter based on the determined Huffman codebook.

In operation 606, the parameter inverse-quantization unit 440 may restore, from a previous parameter and a current phase parameter, a quantized phase parameter through an inverse differential decoding and a modulo operation based on the $dT_1$ or $dF_1$.

In operation 607, when the encoding mode is the 2D Huffman coding based on the determination of operation 603, the parameter inverse-quantization unit 440 may perform an LAV decoding.

In operation 608, the parameter inverse-quantization unit 440 may determine a Huffman codebook based on the LAV, and perform a 2D Huffman decoding on the phase parameter based on the determined Huffman codebook.

In operation 609, the parameter inverse-quantization unit 440 may restore information about a relation of magnitude of X and Y decoded by the 2D Huffman decoding, and rearrange an order of X and Y based on the restored information about the relation of magnitude of X and Y.

In operation 610, the parameter inverse-quantization unit 440 may restore the quantized phase parameter from the X and Y where the order is rearranged through the inverse differential decoding and the modulo operation.

In operation 611, the parameter inverse-quantization unit 440 may inverse-quantize the quantized phase parameter restored in operation 606 or in operation 610.

In operation 602, when the type of the parameter is different from the phase parameter based on the determination of operation 601, the parameter inverse-quantization unit 440 may inverse-quantize a second parameter other than the phase parameter.

Hereinafter, operation 602 will be further described with reference to FIG. 7.

In operation 60201, the parameter inverse-quantization unit 440 may determine an encoding mode of the second parameter. More specifically, in operation 60201, the parameter inverse-quantization unit 440 may determine whether the encoding mode of the second parameter is a 1D Huffman coding or a 2D Huffman coding.

In operation 60202, when the encoding mode of the second parameter is the 1D Huffman coding based on the determination of operation 60201, the parameter inverse-quantization unit 440 may determine $dT_2$ or $dF_2$.

In operation 60203, the parameter inverse-quantization unit 440 may determine a Huffman codebook based on the determined $dT_2$ or $dF_2$, and perform a 1D Huffman decoding on the second parameter based on the determined Huffman codebook.

In operation 60204, the parameter inverse-quantization unit 440 may decode a sign of a difference between a current second parameter and a previous second parameter.

In operation 60205, the parameter inverse-quantization unit 440 may restore, from the previous second parameter and the current second parameter, a quantized second parameter through an inverse-differential decoding based on the $dT_2$ or $dF_2$.

In operation 60206, when the encoding mode of the second parameter is the 2D Huffman coding based on the determination of operation 60201, the parameter inverse-quantization unit 440 may perform an LAV decoding.

In operation 60207, the parameter inverse-quantization unit 440 may determine a Huffman codebook based on the LAV, and perform a 2D Huffman decoding on the phase parameter based on the determined Huffman codebook.

In operation 60208, the parameter inverse-quantization unit 440 may restore information about a relation of magnitude of X and Y decoded by the 2D Huffman decoding, and rearrange an order of the X and Y based on the restored information about the relation of magnitude.

In operation 60209, the parameter inverse-quantization unit 440 may decode a sign of the X and Y where the order is rearranged.

In operation 60210, the parameter inverse-quantization unit 440 may restore, from the X and Y where the order is rearranged, a quantized second parameter through an inverse-differential decoding.

In operation 60211, the parameter inverse-quantization unit 440 may inverse-quantize the quantized second parameter restored in operation 60205 and operation 60210.

In operation 611, the parameter inverse-quantization unit 440 may inverse-quantize the quantized second parameter restored in operation 606 and operation 608, and restore the phase parameter.

Figure 8:
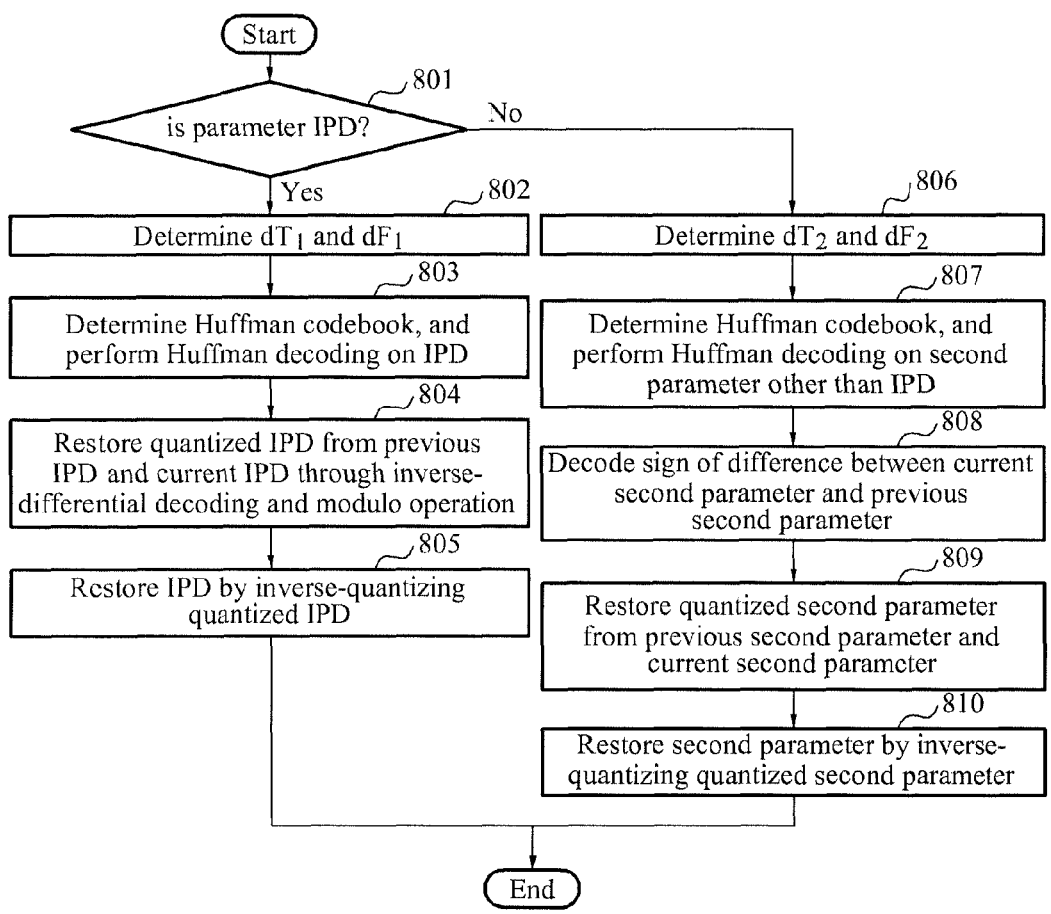
FIG. 8 is a flowchart illustrating operations of a parameter inverse quantization unit of inverse-quantizing parameters based on a Parametric Stereo (PS) lossless coding scheme.

FIG. 8 is a flowchart illustrating operations of a parameter inverse-quantization unit of inverse-quantizing parameters based on a Parametric Stereo (PS) lossless coding scheme.

In operation 801, the parameter inverse-quantization unit 440 may determine whether a type of a parameter is an IPD.

In operation 802, when the type of the parameter is the IPD based on the determination of operation 801, the parameter inverse-quantization unit 440 may determine $dT_1$ or $dF_1$.

In operation 803, the parameter inverse-quantization unit 440 may determine a Huffman codebook based on the determined $dT_1$ or $dF_1$, and perform a Huffman decoding on the IPD based on the Huffman codebook.

In operation 804, the parameter inverse-quantization unit 440 may restore, from a previous IPD and a current IPD, a quantized IPD through an inverse-differential decoding and a modulo operation based on the $dT_1$ or $dF_1$.

In operation 805, the parameter inverse-quantization unit 440 may inverse-quantize the quantized IPD to restore the IPD.

In operation 806, when the type of the parameter is different from the IPD based on the determination of operation 801, the parameter inverse-quantization unit 440 may determine $dT_2$ or $dF_2$.

In operation 807, the parameter inverse-quantization unit 440 may determine a Huffman codebook based on the $dT_2$ or $dF_2$, and perform a Huffman decoding on a second parameter other than the IPD based on the determined Huffman codebook.

In operation 808, the parameter inverse-quantization unit 440 may decode a sign of a difference between a current second parameter and a previous second parameter.

In operation 809, the parameter inverse-quantization unit 440 may restore, from the previous second parameter and the current second parameter, a quantized second parameter through an inverse-differential decoding based on the $dT_2$ or $dF_2$.

In operation 810, the parameter inverse-quantization unit 440 may inverse-quantize the quantized second parameter to restore the second parameter.

The decoding apparatus 400 of the multi-channel signal according to an embodiment will be further described with reference to FIG. 4.

The up-mixing unit 450 may up-mix the mono signal using the restored parameters and the estimated OPD.

The up-mixing may generate stereo signals of at least two channels from mono signals of a single channel, and correspond to the down-mixing. Hereinafter, operations of the up-mixing unit 450 that may up-mix the mono signal using the CLD, the ICC, the IPD, and the OPD will be further described.

When the ICC value is, the up-mixing unit 450 may obtain a first phase $\alpha+\beta$ and a second phase $\alpha-\beta$ using the second and third intermediate variables $c_1$ and $c_2$, as illustrated in the following Equations 14 and 15.

$$\alpha + \beta = \frac{1}{2}\arccos\rho \cdot \left(1 + \frac{c_1 - c_2}{\sqrt{2}}\right), \text{ and} \quad \text{[Equation 14]}$$

$$\alpha - \beta = \frac{1}{2}\arccos\rho \cdot \left(1 - \frac{c_1 - c_2}{\sqrt{2}}\right). \quad \text{[Equation 15]}$$

Next, when the restored mono signal is M and a decorrelated signal is D, the up-mixing unit 450 may obtain an up-mixed left channel signal and an up-mixed right channel signal, as illustrated in the following Equations 16 and 17, using the first and second phases, the second and third intermediate variables $c_1$ and $c_2$, $\phi_1$ of the OPD value obtained from Equation 11, and $\phi_2$ of the value obtained from Equation 12.

$$L'=(M\cdot\cos(\alpha+\beta)+D\cdot\sin(\alpha+\beta))\cdot\exp(j\phi_1)\cdot c_2, \quad \text{[Equation 16]}$$

and $$R'=(M\cdot\cos(\alpha-\beta)-D\cdot\sin(\alpha-\beta))\cdot\exp(j\phi_2)\cdot c_1. \quad \text{[Equation 17]}$$

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A method of obtaining parameters for use in decoding a down-mixed mono signal, the method comprising:
   receiving a bitstream transmitted from an encoding end; and
   decoding, from the bitstream, a plurality of parameters including a channel level difference and an interchannel phase difference, wherein the interchannel phase difference indicates a phase difference between channels,
   wherein the interchannel phase difference is decoded by obtaining an index for a Largest Absolute Value (LAV) of the interchannel phase difference from the bitstream, obtaining the LAV of the interchannel phase difference from the index, determining a Huffman Codebook based on the LAV, decoding symbols of the interchannel phase difference based on the determined Huffman codebook, and obtaining a quantized interchannel phase difference from the decoded symbols.

2. The method of claim 1, wherein a modulo operation is further performed on a difference of adjacent quantized interchannel phase differences.

3. The method of claim 1, wherein the Huffman codebook includes a data set (LavIdx, LavTabIPD), and the data set includes (0,7), (1,1), (2,3), and (3,5).

4. The method of claim 1, wherein the decoding the symbols of the interchannel phase difference is based on two-dimensional Huffman decoding.

5. A method of generating a stereo signal from a down-mixed mono signal, the method comprising:
   receiving a bitstream transmitted from an encoding end;
   decoding, from the bitstream, the down-mixed mono signal;
   decoding, from the bitstream, a plurality of parameters including a channel level difference and an interchannel phase difference, wherein the interchannel phase difference indicates a phase difference between two channels; and
   up-mixing the decoded down-mixed mono signal based on the decoded plurality of parameters,
   wherein the interchannel phase difference is decoded by obtaining an index for a Largest Absolute Value (LAV) of the interchannel phase difference from the bitstream, obtaining the LAV of the interchannel phase difference from the index, determining a Huffman Codebook based on the LAV, decoding symbols of the interchannel phase difference based on the determined Huffman codebook, and obtaining a quantized interchannel phase difference from the decoded symbols.

6. The method of claim 5, wherein a modulo operation is further performed on a difference of adjacent quantized interchannel phase differences.

7. The method of claim 5, wherein the Huffman codebook includes a data set (LavIdx, LavTabIPD), and the data set includes (0,7), (1,1), (2,3), and (3,5).

8. The method of claim 5, wherein the decoding the symbols of the interchannel phase difference is based on two-dimensional Huffman decoding.

9. A method of decoding a phase parameter, the method comprising:

obtaining an index for a Largest Absolute Value (LAV) of the phases parameter from a bitstream;

obtaining the LAV of the phase parameter from the index;

determining a Huffman Codebook based on the LAV;

decoding symbols of the phase parameter based on the determined Huffman codebook; and obtaining a quantized phase parameter from the decoded symbols, wherein the phase parameter corresponds to an interchannel phase difference indicating a phase difference between channels.

10. The method of claim 9, wherein a modulo operation is further performed on a difference of adjacent quantized phase parameters.

11. The method of claim 9, wherein the Huffman codebook includes a data set (LavIdx, LavTabIPD), and the data set includes (0,7), (1,1), (2,3), and (3,5).

12. The method of claim 9, wherein the decoding the symbols of the phase parameter is based on two-dimensional Huffman decoding.

* * * * *